(12) United States Patent
Douglass, III et al.

(10) Patent No.: US 9,815,229 B2
(45) Date of Patent: Nov. 14, 2017

(54) METHOD OF ROTATIONAL MOLDING RIB PROFILE FOR LARGE DIAMETER PIPE FITTINGS

(71) Applicants: Carl Raymond Douglass, III, Spicer, MN (US); Joseph Dale Larkins, Willmar, MN (US)

(72) Inventors: Carl Raymond Douglass, III, Spicer, MN (US); Joseph Dale Larkins, Willmar, MN (US)

(73) Assignee: Prinsco, Inc., Willmar, MN (US)

( * ) Notice: Subject to any disclaimer, the term of this patent is extended or adjusted under 35 U.S.C. 154(b) by 391 days.

(21) Appl. No.: 14/603,658

(22) Filed: Jan. 23, 2015

(65) Prior Publication Data
US 2015/0151463 A1 Jun. 4, 2015

Related U.S. Application Data

(62) Division of application No. 13/375,368, filed as application No. PCT/US2010/036800 on Jun. 1, 2010, now Pat. No. 8,967,674.
(Continued)

(51) Int. Cl.
*B29C 41/04* (2006.01)
*B29C 33/42* (2006.01)
(Continued)

(52) U.S. Cl.
CPC .............. *B29C 41/04* (2013.01); *B29C 33/42* (2013.01); *F16L 41/021* (2013.01); *F16L 47/32* (2013.01);
(Continued)

(58) Field of Classification Search
CPC ....... B29C 41/04; B29C 41/042; F16L 41/023
(Continued)

(56) References Cited

U.S. PATENT DOCUMENTS 1,909,005 A * 5/1933 Paugh .................. B21C 37/207
138/38
2,340,349 A 2/1944 Somes
(Continued)

FOREIGN PATENT DOCUMENTS

EP 0482277 A1 4/1992
JP 01307594 A 12/1989
(Continued)

OTHER PUBLICATIONS

Prinsco, Inc., Website, Pertinent Pages Included, available through archive.org, snapshot as of date Nov. 13, 2006.*
(Continued)

*Primary Examiner* — Christina Johnson
*Assistant Examiner* — Andrew Graham
(74) *Attorney, Agent, or Firm* — Schroeder & Siegfried, P.A.

(57) ABSTRACT

A method of rotationally molding a large-diameter pipe fitting, the wall structure of which is characterized as having a generally smooth interior surface and an exterior surface that is defined by a plurality of axially-spaced circumferentially extending ribs which are monolithically formed and homogeneous with the smooth interior surface of the fitting. The fitting is seamless and modularly designed with integral coupling elements at each terminal end, and with a ribbed wall structure profile capable of withstanding the loads typically found in buried applications with watertight performance requirements, where such ribbed wall structure meets the following dimensions and dimensional ratios: Rib Sidewall Angle (95-105 degrees); Bottom/Top Rib Thickness Ratio (1.80-2.80); Pitch/Rib Height Ratio (1.50-1.95); Rib Height/Fitting Diameter Ratio (0.04-0.09); and Avg. Rib Thickness/Rib Height Ratio (0.28-0.40).

12 Claims, 3 Drawing Sheets

Related U.S. Application Data

(60) Provisional application No. 61/183,138, filed on Jun. 2, 2009.

(51) Int. Cl.
  *F16L 41/02* (2006.01)
  *F16L 47/32* (2006.01)
  *B29K 23/00* (2006.01)
  *B29L 31/24* (2006.01)

(52) U.S. Cl.
  CPC ... *B29K 2023/065* (2013.01); *B29L 2031/246* (2013.01); *Y10S 285/903* (2013.01)

(58) Field of Classification Search
  USPC ........................................................ 264/310
  See application file for complete search history.

(56) References Cited

U.S. PATENT DOCUMENTS

| | | | |
|---|---|---|---|
| 3,467,180 A | 9/1969 | Pensotti | |
| 3,791,679 A | 2/1974 | Glover | |
| 4,146,565 A * | 3/1979 | Quraishi | B22C 7/00 264/219 |
| 4,286,808 A | 9/1981 | Fouss et al. | |
| 4,913,473 A | 4/1990 | Bonnema et al. | |
| 4,915,425 A | 4/1990 | Hegler et al. | |
| 5,071,173 A * | 12/1991 | Hegler | F16L 25/0045 285/399 |
| 5,305,800 A | 4/1994 | Kolberg | |
| 6,644,357 B2 * | 11/2003 | Goddard | F16L 11/15 138/121 |
| 6,938,933 B2 * | 9/2005 | Starita | F16L 9/06 285/364 |
| 7,063,108 B2 * | 6/2006 | Toliver | F16L 11/15 138/121 |
| 7,833,459 B2 * | 11/2010 | Riggins | B29C 33/0033 264/311 |
| 7,976,753 B2 * | 7/2011 | Lupke | B29C 57/00 264/209.3 |
| 2003/0136789 A1 * | 7/2003 | Bolzer | B65D 88/06 220/567.1 |
| 2005/0256266 A1 * | 11/2005 | Lustiger | B29C 41/04 525/191 |
| 2006/0191623 A1 * | 8/2006 | Lutz | B29C 65/485 156/94 |
| 2010/0047596 A1 * | 2/2010 | Maziers | B29C 41/003 428/476.9 |
| 2011/0017749 A1 * | 1/2011 | Maziers | B29C 41/042 264/241 |

FOREIGN PATENT DOCUMENTS

| | | |
|---|---|---|
| JP | 06-011076 A | 1/1994 |
| JP | 02542232 B2 | 7/1996 |
| JP | 2002-340253 A | 11/2002 |
| JP | 2008-185093 A | 8/2008 |
| KR | 20-1988-000389 Y1 | 3/1988 |
| KR | 20-1989-000343 Y1 | 3/1989 |

OTHER PUBLICATIONS

Glenn L. Beall, Rotational Molding Design, Materials, Tooling and Processing, Book, 1998, pp. 80-85, Hanser/Gardner Publications, Inc., Cincinnati, Ohio.

Paul Nugent, Rotational Molding: A Practical Guide, Book, 2001; pp. 303-304, Self-published, USA.

\* cited by examiner

METHOD OF ROTATIONAL MOLDING RIB PROFILE FOR LARGE DIAMETER PIPE FITTINGS

CROSS REFERENCE TO RELATED APPLICATIONS

This application is a division of co-pending U.S. patent application Ser. No. 13/375,368 filed on Nov. 30, 2011, which is the U.S. Section 371 National Stage application corresponding to International Application No. PCT/US10/36800 filed Jun. 1, 2010, which claims the benefit of commonly assigned Provisional Application Ser. No. 61/183,138, filed on Jun. 2, 2009 by the same inventor, entitled "Rib Construction for Large Diameter Pipe Fittings," the benefit of the filing date of which is hereby claimed. The entire disclosure of each of the above applications is incorporated herein by reference.

BACKGROUND OF THE INVENTION

The present invention relates generally to the art of plastic pipe fittings for connecting tubing, pipe and the like. More specifically, the present invention relates to the construction of a "ribbed" pipe fitting for connecting large-diameter corrugated plastic pipe used in, and without limitation to, buried gravity-flow drainage, water storage, and sewage applications, particularly dual wall pipe having a smooth interior wall for handling increased load, deep fill or increased fluid flow capacity, with increased internal and external hydrostatic pressures. Although the present invention has particular relevance to the above applications, it will be appreciated that the principles of the present invention may also find application in other types of pipe and tubing configurations where structural performance or watertight integrity are especially critical.

For purposes of the present invention, it is important to note the difference between pipe and pipe fittings having a "ribbed" wall structure profile and those having an outer "corrugated" wall structure profile. The primary difference is that a "ribbed" wall structure profile is solid and homogeneous throughout, whereas a "corrugated" wall structure profile is defined by a relatively thin outer wall structure that follows the contour and forms each corrugation. Thus, an open space is defined between opposing sidewalls of each corrugation, whereas each rib is solid throughout. Consequently, to achieve comparable structural performance, the formation of pipes and fittings having a ribbed wall construction will typically require a greater volume of material than pipes and fittings having corrugations of comparable size.

Historically, gravity-flow drainage pipe utilized for agricultural, residential, civil construction and recreational purposes was constructed of concrete, steel or clay. The use of plastic materials, however, such as high-density polyethylene (HDPE), has gained significant popularity over the years in the construction of in-ground corrugated tubing for use in gravity-flow water management and sewage applications. In high volume water management applications, such as storm sewers, highway drains and culverts, large diameter (12"-60" dia.) "dual" wall corrugated plastic pipe is now typically utilized. Such dual wall pipe is characterized by having a smooth inner cylindrical wall to which an outer corrugated wall is attached. The corrugation profile of the outer wall typically has a relatively broad crown region and steep sidewalls, thereby defining a hollow interior between the corrugation and inner wall. This construction has been found to minimize material cost while at the same time maximize fluid flow and structural capability under buried load conditions. Examples of patents disclosing such dual wall corrugated pipe include Goddard, U.S. Pat. No. 6,644,357; Hegler, U.S. Pat. No. 5,071,173; Hegler, U.S. Pat. No. 4,779,651; and Bonnema et al., U.S. Pat. No. 4,913,473.

Most corrugated pipe in the HDPE pipe industry, including dual wall pipe, are now formed via a continuous in-line molding process, whereby each section of pipe is molded with an integrally-formed bell coupler that facilitates connection to an adjoining section of corrugated plastic pipe. For dual wall pipe, a two-stage process is used, whereby the outer corrugated wall is extruded first and the inner smooth wall follows, attaching itself to the outer corrugated wall.

Corrugated plastic pipe fittings, on the other hand, such as tees, wyes, elbows, bends, etc., are not typically molded in-line. In fact, for large-diameter corrugated pipe, hand fabricated (i.e., non-molded) fittings have become the standard for use due to the relatively low entrance costs and related manufacturing difficulties. Such fittings are typically fabricated by cutting a smaller section of corrugated pipe to mate with an adjoining section, and then hand or machine welding the two together at their seam to form the desired fitting. For instance, to form a Tee fitting, a circular aperture is cut into the side of the first section of corrugated pipe, and then a second section of pipe is cut and fitted to mate with the opening of the first pipe. Thereafter, the two sections of pipe are welded together at their seam. Separate coupler sections (typically bell couplers) are then welded to the ends of each of the pipe sections in the same manner. Consequently, multiple welded seams are required to form such a fabricated pipe fitting.

While some attempts have previously been made to mold plastic corrugated pipe fittings at smaller diameters (typically 10" or less), for a number of reasons, this has not been the case for large-diameter pipe fittings. First, smaller diameter pipe does not typically experience the significant loading, and resultant levels of material stress and strain experienced by large diameter pipe. Consequently, the design, service, and material requirements are less stringent, and small diameter molded fittings can be produced more economically.

Secondly, as pipe diameters increase, difficulties in the molding process also increase, particularly for pipe fittings having a smooth interior with ribbed or corrugated exterior configurations. For instance, with injection molding, the core of the mold must include a "draft angle" to permit proper separation of the mold from the molded part. At larger diameters, this draft angle has an exaggerated effect resulting in a constriction of the interior of the molded fitting, thus adversely affecting the hydraulic performance of the pipe. Such large-diameter molds are also extremely expensive to manufacture, as the molds must be formed of solid steel to withstand the high pressure during the injection process.

Blowmolding is also generally unsuitable for fittings having a smooth interior, as it uses internal pressure to essentially stretch an extruded sheet of plastic to the desired shape. Thus, the molded pipe fitting takes on the shape of the exterior surface of the mold (i.e., corrugated), and it becomes very difficult to form a smooth interior. Increasing wall thickness in attempt to fill corrugations and create a smooth interior "ribbed" wall structure can lead to bridging and other defects caused by attempting to bend the thicker material around tight corners and through narrow passageways.

The use of rotational molding (i.e., process of heating and rotating a hollow mold to melt and disperse imported plastic material against the inner surface of the mold for subsequent cooling and formation of a product) has also been discouraged in the formation of solid ribbed structures, due in large part to manufacturing difficulties, geometry constraints and costs involved. While generally considered unsuitable for forming smaller fittings due to cycle times, geometry requirements, and material costs, rotational molding does provide a possible viable option for manufacturing large-diameter pipe fittings, where increased profile geometries tend to be more desirable for use in buried applications where watertight and/or increased structural integrity is necessary. If utilized at all, however, rotational molding has in past history been typically limited in use to the formation of relatively thin single-walled structures having hollow corrugations or solid ribs with shallower, broader profiles, which are not suitable for use in deep fill and heavy load conditions.

Consequently, it has long since been generally well accepted in the HDPE corrugated pipe industry that the mold and material costs, and design challenges associated with implementing rotational molding of large-diameter structural pipe fittings with smooth interiors was simply too great. Since it is not presently practical to mold dual wall fittings individually with a smooth interior and outer "corrugated" wall structure, any such molded fitting must be constructed with a solid ribbed profile. Consequently, the belief in the industry has been that the challenges associated with the design and material cost of the fitting would be prohibitive in comparison to fabricating such fittings by hand from leftover sections of corrugated tubing. For this reason, the industry has for many years continued to rely upon the use of hand fabricated fittings for large diameter corrugated tubing.

Although functional, these hand fabricated fittings do come with a number of limitations and drawbacks. Since fabricated fittings are manufactured separately by hand, there is no modularity in design, and their consistency can vary, sometimes significantly, from a number of variables including personnel, equipment settings, method of fabrication, etc. This is readily seen since fabricated fittings are made from flat stock which requires molding pipe from resin, shipping the pipe sections to and from a fabrication facility, with additional cutting and preparation of components for welding thereafter.

Furthermore, the welding process itself is complicated and can lead to inconsistencies and performance deficiencies. The failure modes for most fabricated fittings occur mainly at the welded joint either as a leakage or structural failure. These inherent inconsistencies, deficiencies, and multiple steps of fabrication lead to performance variations/limitations, especially as it relates to the watertight and structural performance of the fabricated fittings. Burial depth and structural performance of fabricated fittings are generally much less than that of standard corrugated pipe. For example, maximum cover for a fabricated fitting is typically less than ten feet 10' as compared to thirty-five feet plus (35'+) for the same diameter HDPE corrugated pipe under similar circumstances. Also, due to the welding process, watertight integrity is always suspect, and one fitting can easily cause enough leakage in a tested watertight system to result in significant liability and cost.

It is therefore apparent that there is a significant need in the industry, particularly as concerns large-diameter corrugated HDPE pipe, for a cost efficient moldable large-diameter pipe fitting which is modular in design and has a seamless (i.e., not hand-fabricated) rigid body that has the structural stability capable of withstanding similar loading conditions as large diameter corrugated HDPE pipe, and which is so constructed as to provide increased watertight integrity and structural performance.

BRIEF SUMMARY OF THE INVENTION

In accordance with the present invention, a rotationally molded large-diameter pipe fitting is provided, the wall structure of which is characterized generally as having a generally smooth interior surface and an exterior surface that is defined by a plurality of axially-spaced circumferentially extending ribs. The exterior surface and each rib of the wall structure are monolithically formed and homogeneous with the generally smooth interior surface of the fitting. Each rib is characterized by a generally flat crown region and a pair of opposing sidewalls extending tangentially and radially inward from the crown toward the smooth interior of the wall structure. Each adjacent rib on the fitting is separated axially by a substantially flat base or "waterway" wall section of generally uniform thickness, hereinafter referred to as the "waterway thickness."

The design of the fitting structure and ribs are critical to the successful performance of the fitting in watertight and buried applications. Each rib shall therefore be defined further as having a first crown thickness measured axially between opposing sidewalls at the point where each of the sidewalls tangentially intersects the crown region, and a second base thickness measured axially between the points where the opposing rib sidewalls intersect the exterior surface of the base wall extending between each rib. Each rib shall also have a height measured from the peak or exterior-most radial point of the rib to the exterior surface of the base wall section extending between each rib, with the distance between the center-points of adjacent ribs defining the pitch of the pipe fitting.

For optimal structural performance in buried applications, it is deemed preferable that the ratio of the base thickness to the crown thickness of each rib fall within the approximate range of 1.80-2.80. Moreover, the ratio of the average rib thickness (average of crown and base measurements) to rib height shall preferably be in the approximate range of 0.28-0.40, and the sidewalls of each rib shall extend radially at an angle relative to the exterior surface of the base wall section, preferably within the approximate range of 95.0 to 105.0 degrees. In furtherance of the above design criteria, the ratio of the pitch to the rib height shall be in the approximate range of 1.50-1.95. Finally, the ratio of the rib height to the internal fitting diameter, measured at the interior surface of the waterway wall section, shall be in the approximate range of 0.04-0.09.

The correlation and interrelation of the foregoing design criteria is important to the overall success of rotationally molding a large-diameter ribbed pipe fitting with a reasonably smooth interior that will meet or exceed the required field service specifications for use in buried applications. Generally speaking, rib height, thickness and pitch are critical dimensions related specifically to the stiffness of the fitting. Taller, thicker ribs will result in higher stiffness but with an overall design which is more costly and less efficient. Shorter ribs will result in reduced stiffness and may also result in the ribs not being solid at the prescribed wall thickness without changing the base width. Sidewall angle is also critical in that steeper sidewall angles generally result in higher ring stiffness, but reduced profile stability under bending strain. Reduced stability will result in localized wall buckling and reduced structural performance limits. Shallower angles, on the other hand, reduce the stiffness value and will likely result in the ribs not being solid, as the base width would also increase.

From a manufacturing standpoint using rotational molding, it has been found that sidewall angles outside the prescribed range tend to result in improperly formed ribs. Below this range, material will build up at the bottom of the ribs and the tops will not be properly formed; above this range, material tends to build up at the top of the ribs and the bottoms will include an excessive "sink" area. Similar problems also result if the prescribed rib base thickness/crown thickness ratio is not adhered to. The average rib thickness/rib height ratio is also important. Failure to maintain the prescribed range for the average rib thickness/rib height ratio can also create profile forming concerns, making it is difficult to properly form each rib.

It is important to note that each of the dimensions and dimensional ratios described above work in concert with one another to allow the structure and profile of the fitting to be as efficient as possible. If designed in accordance with the above criteria, a molded, seamless, modularly designed large-diameter pipe fitting may be produced that will offer increased watertight integrity and structural performance in buried applications. Contrary to popular belief in the corrugated polyethylene pipe industry, it has been found that by adhering to the above design criteria, such large-diameter pipe fittings may be manufactured through the use of a rotational molding process in a cost effective/competitive manner that will actually result in a cost savings over conventional hand fabrication of such fittings, with the added benefit of providing enhanced watertight integrity and structural performance capabilities.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
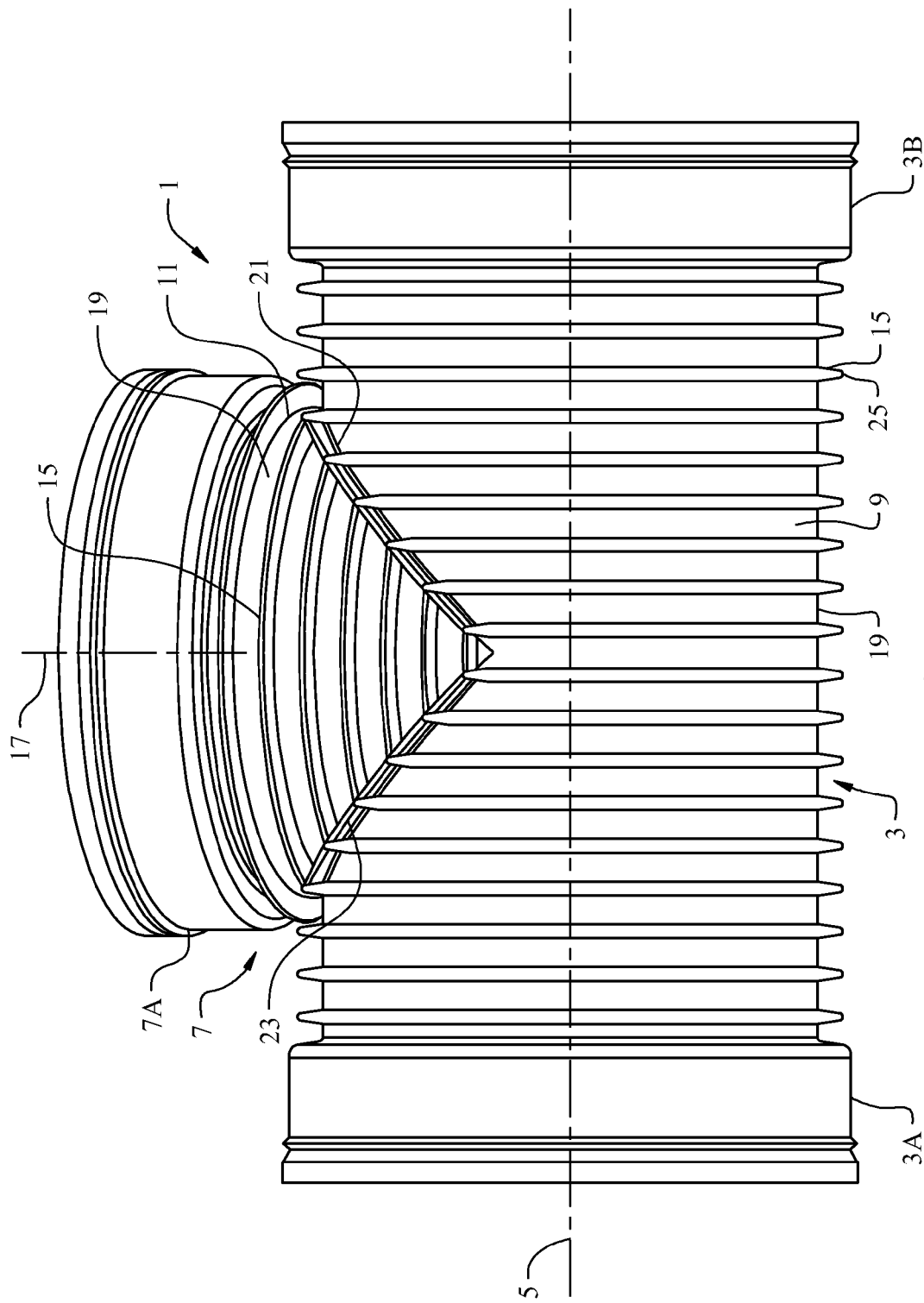
FIG. 1 is a top plan view of an illustrative Tee pipe fitting constructed in accordance with the present invention.
Figure 2:
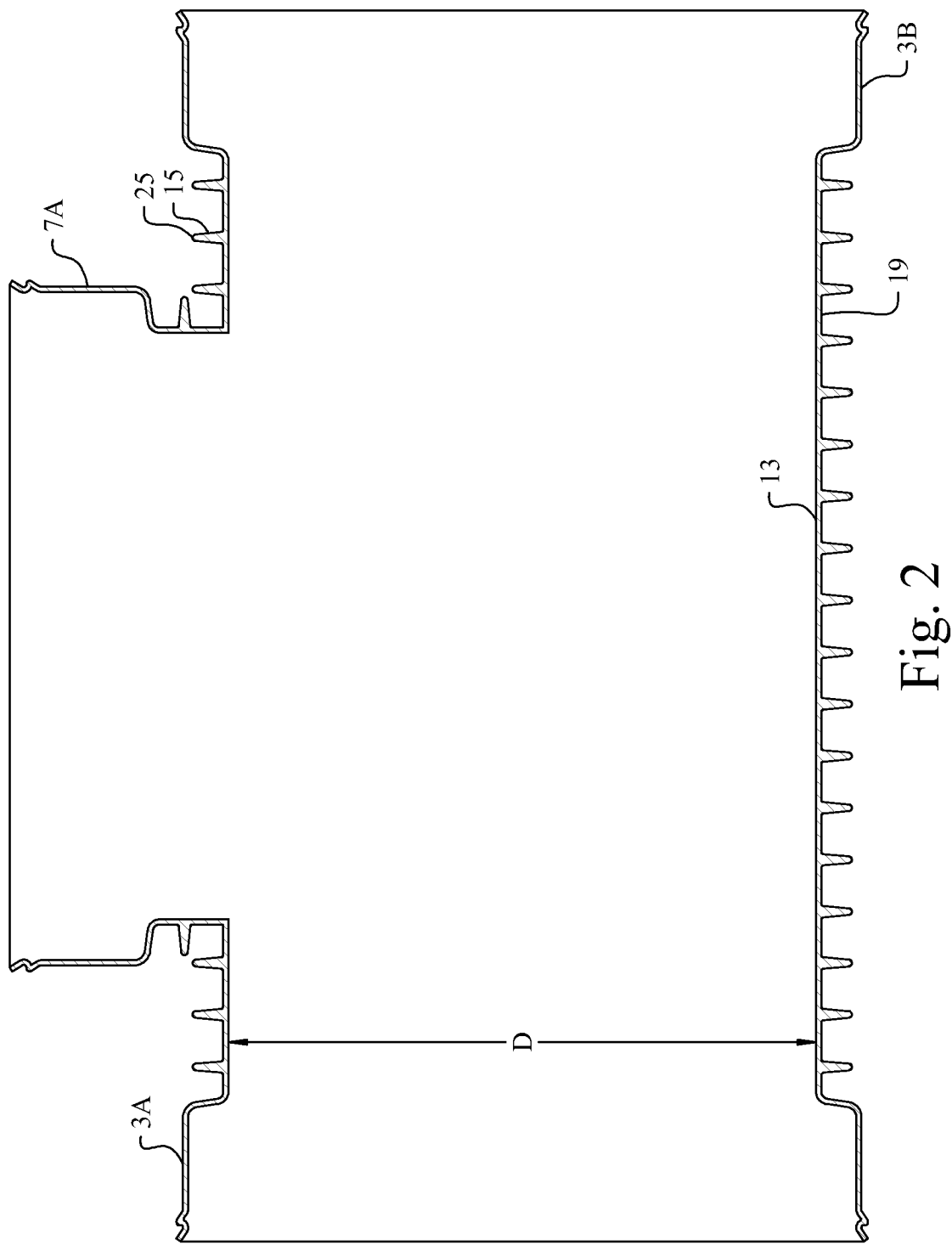
FIG. 2 is a horizontal section of the fitting shown in FIG. 1, showing the solid "ribbed" wall structure thereof.
Figure 3:
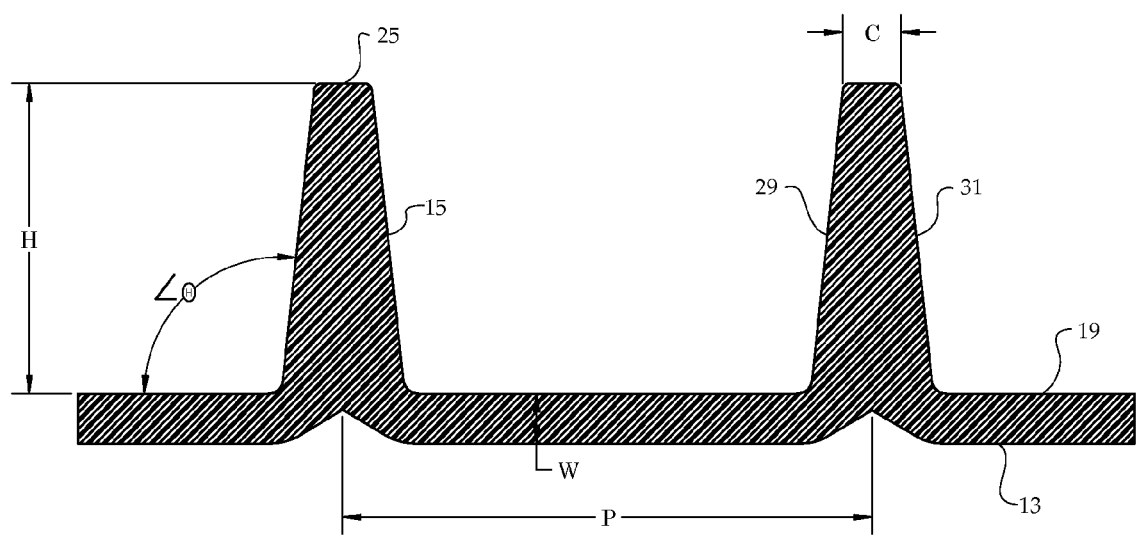
FIG. 3 is a blown up sectional view of a portion of the ribbed wall structure of the pipe fitting shown in FIG. 2.

With reference to the drawings, and for purposes of illustration, FIG. 1 discloses a large-diameter "Tee" fitting 1 which has been rotationally molded in accordance with the present invention. As noted previously, due to difficulties associated with molding plastic pipe fittings for large-diameter pipe, and considerable costs related thereto, it has historically been considered impractical in the HDPE pipe industry to manufacture large-diameter pipe fittings solely using a molding process. Consequently, it has long since been standard practice in the HDPE pipe industry to hand fabricate large-diameter pipe fittings by cutting a smaller section of "corrugated" pipe to mate with an adjoining section, and then hand or machine welding the two together at their seam to form the desired fitting. Contrary to such belief, however, and somewhat unexpectedly, it has been found that by adhering to certain design criteria, large-diameter pipe fittings having a solid "ribbed" (as opposed to "corrugated") wall structure may be manufactured through the use of a rotational molding process in a cost effective/competitive manner that will actually result in a cost savings over conventional hand fabrication of such fittings, with the added benefit of providing enhanced watertight integrity and structural performance capabilities.

Thus, as shown throughout the drawings, fitting 1 is comprised generally of a main hollow, cylindrical plastic section of pipe or tubing 3 having a longitudinal axis 5, with an adjoining integrally-formed hollow, generally cylindrical "Tee" or leg section 7 of pipe or tubing extending outwardly from the main wall structure 9 thereof. As shown, the main wall structure 9 of tubing section 3 and the wall structure 11 of leg section 7 are homogeneously formed in the rotational molding process, thereby defining a seamless joint 21 therebetween. As used herein and throughout the appended claims, the term "seamless" or "seamlessly" is meant to denote that the joint connecting two or more elements has been formed simultaneously as a homogeneous continuum of the connected elements, and not formed through a secondary process of hand fabrication. For purposes of the Tee fitting 1 shown in the drawings, each of the opposite ends of the main tubular section 3 and the terminal end of leg section 7 define uniformly configured seamless integral bell coupling elements 3A, 3B and 7A, respectively, which facilitate connection to adjoining sections of pipe and modularity in design. It will be appreciated, however, that fitting 1 could take the form of any type of fitting, such as wyes, elbows, bends, reducers, etc., having various coupling mechanisms molded integrally therewith, without departing from the invention described and claimed herein.

As noted, fitting 1 is specifically designed for connecting large-diameter corrugated plastic pipe used in, and without limitation to, buried gravity-flow drainage, water storage, and sewage applications, particularly dual wall pipe having a smooth interior wall for handling increased fluid flow capacity, and increased internal and external hydrostatic pressures. As shown throughout the drawings, fitting 1 has a homogeneously molded solid "ribbed" wall structure throughout, being characterized generally by a smooth cylindrical inner wall 13 and an exterior surface that is defined by a plurality of axially-spaced circumferentially extending ribs 15. On the main section of pipe 3, ribs 15 are uniformly spaced axially along the length thereof between the integrally-formed terminal bell couplers 3A and 3B. Similarly, on leg section 7, ribs 15 are spaced uniformly along its axis 17, emanating outward from the joint 21 between leg section 7 and main pipe section 3 toward the terminal bell coupling element 7A. Extending axially between each rib 15 is a substantially flat base or "waterway" wall section 19 of generally uniform thickness.

As shown best in FIG. 1, at least some of the ribs 15 on leg section 7 and pipe section 3 intersect at the joint 21 therebetween so as to form a continuum of ribs extending across and around the fitting 1. At seamless joint 21, for added structural integrity, optional reinforcement ribs 23 span across and interconnect adjacent ribs 15, thereby forming an outer structural latticework of ribs which further strengthen and reinforce the area of joint 21 between leg 7 and main pipe section 3.

As noted previously, the design of the fitting structure and ribs 15 are critical to the successful performance of the fitting 1. Therefore, for purposes of the following discussion, inner wall 13 of fitting 1 is deemed to have an internal waterway diameter D, and a "waterway" wall thickness W measured between adjacent ribs 15. As shown best in FIGS.

2 and 3, each rib 15 is monolithically formed with the inner wall 13 and is solid and homogeneous throughout. Each rib 15 includes a generally flat crown portion 25, the major axial portion of which extends generally parallel with the waterway section 19 extending between each rib. Each rib 15 has a first crown thickness C measured axially between the tangential intersection of its opposing sidewalls 29 and 31 and crown region 25, and a second base thickness B measured axially between the points where its opposing sidewalls 29 and 31 intersect the exterior surface of the base wall section 19 extending between each rib 15. Each rib 15 also includes a height H measured from the peak or exterior-most radial point of the rib 15 to the exterior surface of the base wall section 19 extending between each rib 15, with the distance between the center-points of adjacent ribs 15 defining the pitch P of the pipe fitting 1. Finally, sidewalls 29 and 31 of each rib 15 are further defined as extending radially outward at an angle θ from the exterior surface of the adjacent base wall section 19 to the crown portion 25 thereof.

Having defined the foregoing dimensions of fitting 1, in order to obtain optimal structural performance in deep fill and heavy load conditions, it is preferable that the ratio B:C, the ratio of the base thickness B to the crown thickness C of each rib 15, fall within the approximate range of 1.80-2.80. Below this range, it has been found that the ribs tend not to completely fill with material. The plastic material will build up at the bottom of the ribs and the tops will not be properly formed, thus resulting in a loss of profile stability, localized profile buckling and reduced load carrying capacity. Above this range, material tends to build up at the top of the ribs 15 and the bottom portion will have extensive voids or an excessive "sink" area on the interior wall adjacent the rib 15.

For similar reasons, it is preferred that the ratio of the average rib thickness (average of crown thickness C and base thickness B) to rib height H be in the approximate range of 0.28-0.40. Outside this range, profile forming concerns tend to become a problem, where it becomes difficult to properly form the rib during the molding process, thus resulting in rib instability and potential profile buckling issues.

The rib sidewall angle θ also correlates to rib thickness ratio B:C. Therefore, it is deemed preferable that the angle θ at which the sidewalls 29 and 31 of each rib 15 extend relative to the base wall section 19 be in the approximate range of 95.0 to 105.0 degrees. Again, below this range, material tends to build up at the bottom of the ribs 15 and the ribs will not completely fill, resulting in an improperly formed crown region. This consequently leads to a loss of rib profile stability, localized profile buckling and reduced load carrying capacity. Above this range, manufacturability becomes an issue, as the plastic material will tend to build up at the top of the rib 15, leaving extensive voids and/or an excessive "sink" area on the interior wall at the base of the rib 15.

The ratio of the pitch P to the height H of the rib 15 (P:H) is also important to ensuring profile stability and structural efficiency of the fitting wall structure. In order to maximize structural efficiency, it is preferred that the ratio P:H fall within the approximate range of 1.50-1.95. Below this range, it has been found that structural efficiency decreases based on the weight of the fitting 1. The fitting 1 will be capable of carrying more load, but not significantly more in comparison to the added weight to fitting 1; thus, the law of diminishing return applies. Moreover, above this range, the manufacturing process/cycle time also increases, and the cost outweighs the performance increase. On the other end, exceeding the preferred range for P:H has also been found to be undesirable in that the structural capacity of the fitting 1 diminishes significantly. This results in the fitting 1 being incapable of withstanding the heavy load conditions or meeting the required specifications for use in large-diameter watertight and deep fill applications.

Finally, the ratio of the rib height H to the internal fitting diameter D (H:D), measured at the smooth interior surface of inner wall 13, should preferably be in the approximate range of 0.04-0.09. It has been found that ratios below the prescribed range tend to result in reduced structural performance of fitting 1, and ratios above this range create rib profile stability and ultimately buckling issues. Furthermore, when comparing the cost of manufacturing fitting 1 to the structural performance capabilities thereof, little is gained outside the prescribed range of H:D ratios, as the law of diminishing returns comes into play once again.

For the convenience of the reader, the following table is provided as a summary of the above-prescribed preferred dimensions and dimensional ratios:

| Preferred Ratios/Dimensions | |
| --- | --- |
| Rib Sidewall Angle θ | 95-105 degrees |
| Bottom/Top Rib Thickness Ratio | 1.8-2.80 |
| Pitch/Rib Height Ratio | 1.50-1.95 |
| Rib Height/Fitting Diameter Ratio | 0.04-0.09 |
| Avg. Rib Thickness/Rib Height Ratio | 0.28-0.40 |

It is important to note that no one dimension or dimensional ratio alone is the determinative factor in the design of fitting 1 for use in buried applications. Indeed, it is the correlation and interrelation of all of the foregoing design criteria together which is important to the overall success of rotationally molding a large-diameter ribbed pipe fitting with a smooth interior that will meet or exceed the required field service specifications for use in buried applications. By adhering to the dimensions and dimensional ratios set forth herein, it has been found that, contrary to popular belief in the corrugated polyethylene pipe industry, a molded, seamless, modularly designed large-diameter pipe fitting may be efficiently and cost-effectively produced that will offer increased watertight integrity and structural performance in buried applications.

It will, of course, be understood that various changes may be made in the form, details, arrangement and proportions of the parts without departing from the scope of the invention which comprises the matter shown and described herein and set forth in the appended claims.

The invention claimed is:

1. A method of producing a ribbed pipe fitting to be used for connecting large-diameter corrugated pipe in underground burial applications, comprising the steps of:

(a) providing a hollow mold for use in a rotational molding process, said mold having an inner surface adapted to form a pipe fitting composed of a main section of pipe of twelve to sixty inches internal diameter with a generally cylindrical wall structure, a smooth inner circumferential surface and an exterior surface defined by a plurality of axially spaced circumferentially extending solid ribs, where each of said ribs includes a crown portion and a pair of opposing radially extending circumferential sidewalls connecting said crown portion to a circumferentially extending waterway section of said wall structure, said waterway section extending axially between said rib and an adjacent said rib, and the dimensional profile of at least some of said ribs being characterized by the following:
an angle (θ) of 95-105 degrees, where said angle (θ) is the angle at which said sidewalls of each of said ribs extend relative to the plane of said waterway section adjacent thereto; a ratio (B:C) of 1.80-2.80, where (B) is the base thickness of each of said ribs measured axially between said opposing sidewalls at the intersection thereof with said exterior surface of said wall structure at said waterway section, and (C) is the crown thickness of each of said ribs measured axially between the tangential intersection of said opposing sidewalls with said crown portion thereof; a ratio (P:H) of 1.50-1.95, where (P) is the pitch or axial distance between adjacent said ribs measured at their center-points, and (H) is the height of each of said ribs measured between said exterior surface at said waterway section and the outermost radial point of said rib; a ratio (H:D) of 0.04-0.09, where (D) is the inner diameter of said wall structure; and a ratio (A:H) of 0.28-0.40, where (A) is the average of the crown thickness (C) and base thickness (B) of each of said ribs;

(b) introducing a measured quantity of plastic material into said mold required for the formation of said ribbed pipe fitting;

(c) rotating said mold while heating said mold to cause said plastic material to melt and coalesce upon said inner surface of said mold;

(d) cooling said mold to cause said plastic material to solidify and form said ribbed pipe fitting; and (e) removing said ribbed pipe fitting from said mold.

2. The method of producing a ribbed pipe fitting set forth in claim 1, wherein said plastic material introduced within said mold is composed of high density polyethylene.

3. The method of producing a ribbed pipe fitting set forth in claim 1, wherein said mold being provided is adapted to form said pipe fitting with a leg section of pipe seamlessly connected to said main section of pipe, said leg section of pipe having a generally cylindrical wall structure centered about an axis with a fluid-flow passageway extending in fluid continuity with a fluid-flow passageway extending through said main section of pipe.

4. The method of producing a ribbed pipe fitting set forth in claim 1, wherein said mold being provided is adapted to form said wall structure of said leg section of pipe with a smooth inner circumferential surface and an exterior surface defined by a plurality of axially spaced circumferentially extending solid ribs.

5. The method of producing a ribbed pipe fitting set forth in claim 1, wherein said mold being provided is adapted to form a seamless joint between said main section of pipe and said leg section of pipe, and a reinforcement member extending along said joint between said ribs on said main section of pipe and between said ribs on said leg section of pipe.

6. The method of producing a ribbed pipe fitting set forth in claim 1, wherein said mold being provided is adapted to form said crown portion of each of said ribs substantially flat throughout with radiused corners connecting said sidewalls thereto.

7. The method of producing a ribbed pipe fitting set forth in claim 1, wherein said mold being provided is adapted to form said pipe fitting with a terminal end comprising an integral bell structure that is seamlessly formed as a part of said wall structure.

8. A method of producing a ribbed pipe fitting to be used for connecting large-diameter corrugated pipe in underground burial applications, comprising the steps of:

(a) providing a hollow mold for use in a rotational molding process, said mold having an inner surface adapted to form a pipe fitting composed of a main section of pipe of twelve to sixty inches internal diameter with a seamlessly connected leg section of pipe extending outwardly therefrom, wherein said main section of pipe and said leg section of pipe each have a generally cylindrical wall structure, a smooth inner circumferential surface and an exterior surface defined by a plurality of axially spaced circumferentially extending solid ribs, where each of said ribs includes a crown portion and a pair of opposing radially extending circumferential sidewalls connecting said crown portion to a circumferentially extending waterway section of said wall structure, said waterway section extending axially between said rib and an adjacent said rib, and the dimensional profile of at least some of said ribs being characterized by the following:

an angle (θ) of 95-105 degrees, where said angle (θ) is the angle at which said sidewalls of each of said ribs extend relative to the plane of said waterway section adjacent thereto; a ratio (B:C) of 1.80-2.80, where (B) is the base thickness of each of said ribs measured axially between said opposing sidewalls at the intersection thereof with said exterior surface of said wall structure at said waterway section, and (C) is the crown thickness of each of said ribs measured axially between the tangential intersection of said opposing sidewalls with said crown portion thereof; a ratio (P:H) of 1.50-1.95, where (P) is the pitch or axial distance between adjacent said ribs measured at their center-points, and (H) is the height of each of said ribs measured between said exterior surface at said waterway section and the outermost radial point of said rib; a ratio (H:D) of 0.04-0.09, where (D) is the inner diameter of said wall structure; and a ratio (A:H) of 0.28-0.40, where (A) is the average of the crown thickness (C) and base thickness (B) of each of said ribs;

(b) introducing a measured quantity of plastic material into said mold required for the formation of said ribbed pipe fitting;

(c) rotating said mold while heating said mold to cause said plastic material to melt and coalesce upon said inner surface of said mold;

(d) cooling said mold to cause said plastic material to solidify and form said ribbed pipe fitting; and (e) removing said ribbed pipe fitting from said mold.

9. The method of producing a ribbed pipe fitting set forth in claim 8, wherein said plastic material introduced within said mold is composed of high density polyethylene.

10. The method of producing a ribbed pipe fitting set forth in claim 8, wherein said mold being provided is adapted to form a reinforcement member extending along said joint between said ribs on said main section of pipe and between said ribs on said leg section of pipe.

11. The method of producing a ribbed pipe fitting set forth in claim 8, wherein said mold being provided is adapted to form said pipe fitting with a terminal end to either or both of said main section of pipe or said leg section of pipe, comprising an integral bell structure that is seamlessly formed as a part of said wall structure.

12. The method of producing a ribbed pipe fitting set forth in claim 8, wherein said step of rotating said mold while heating said mold causes said plastic material to form said solid ribs monolithically and homogeneous with said smooth inner circumferential surface of the fitting.

\* \* \* \* \*